United States Patent Office 3,417,963
Patented Dec. 24, 1968

3,417,963
AUTOMATIC SLACK TAKEUP DEVICE FOR TOOLS
ROTATED AT HIGH SPEED AND MOUNTED ON
BALL BEARINGS
Emilio Maverna, Via per Bellusco 9,
Ornago, Milan, Italy
Filed June 1, 1966, Ser. No. 554,514
Claims priority, application Italy, June 5, 1965,
12,624/65
4 Claims. (Cl. 253—2)

ABSTRACT OF THE DISCLOSURE

A rotary dental tool in which bearings support a pneumatically driven rotor and part of one bearing is displaceable by the pneumatic pressure to take up slack in the bearings.

---

This invention relates to a device for automatically taking up slack in tools rotated at very high speeds and mounted on ball bearings.

This invention is concerned with the improvement, for example, of turbines used in dentistry and, more particularly, tools used for drilling human teeth, such as the angular toolholders as used by dentists. The inventive device is essentially characterized in that the means intended to take up slack resulting from mutual shifting of parts of the bearings is a pneumatic pressure such as, for example compressed air. Although the device of the invention is generally applicable to various kinds of tool-holders, an exemplary and non-limiting embodiment will be described herein as applied to an angular toolholder for dentist's drills.

It should be borne in mind that in such tools in which there is a shaft mounted on ball bearings which are rotated at a high speed, both the axial and radial clearances between the balls and their rings or races are exceedingly high for the shafts of dentist's drills and the like, and they give rise to vibrations which do not permit an accurate machining of human teeth. Hence the necessity arises of eliminating said clearances.

To this end, devices are already known in which resort is had to springs applied to one of the rings of the bearing to displace it slightly with respect to the other ring and take up or reduce said clearance, the contact between rings and balls taking place in such a case along lines which are slanted with respect to the axis of rotation of the bearing, rather than perpendicular thereto.

However, such spring actuated devices, due to the tiny size of the springs which must be applied, and due to the impossibility of an efficient adjustment, have proven to be of little practical use.

The foregoing and other shortcomings are done away with by adopting the inventive device wherein springs have been dispensed with and the axial displacement of a bearing ring takes place merely due to a pressurized air preload, which is the same air which rotates the tool-holding shaft, and wherein said preload is automatically adjustable as a function of the air pressure, that is, of the shaft's speed.

The inventive device will be now described in more detail in connection with an exemplary embodiment thereof which is in no way a limitation, the disclosure being aided by the accompanying drawing, wherein.

Figure 1:
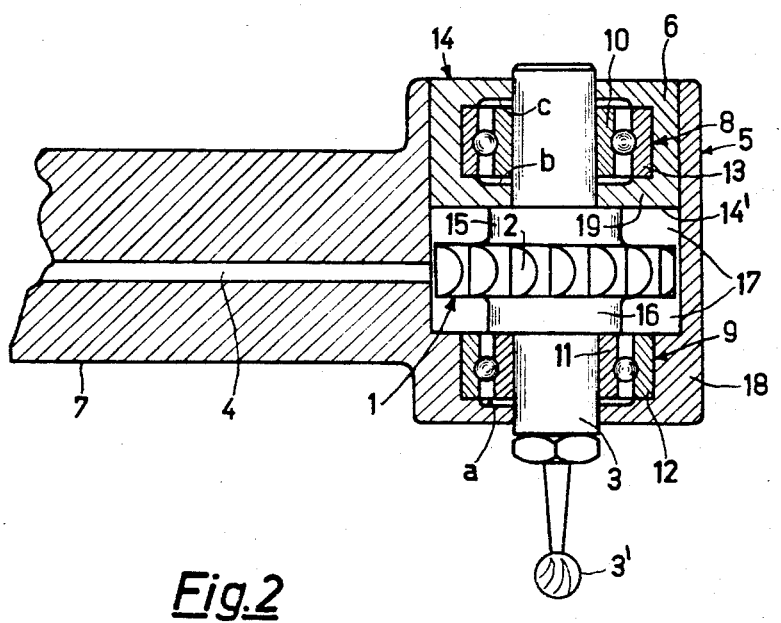
FIGURE 1 is an axial cross-sectional view of an angular tool-holder for dentist's drills, equipped with the inventive device.
Figure 2:
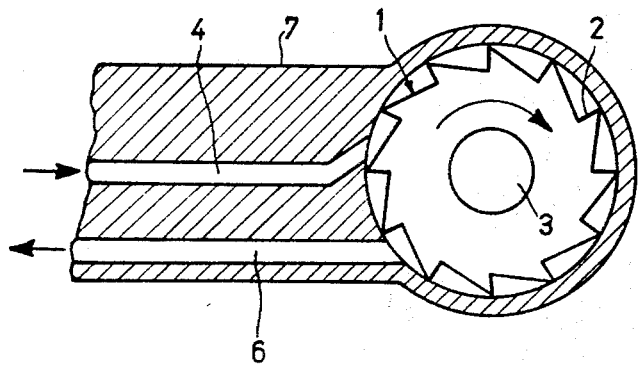
FIGURE 2 shows a horizontal cross-sectional view of said tool-holder, in plan view.

With reference to the figures listed above, they show a dentist's turbine 1, comprising a set of vanes 2 keyed to a shaft 3 (which carries the tool 3') and impelled by compressed air supplied by a duct 4, enclosed in a cylindrical rotor casing 5 from which an outlet duct 6 opens, the two conduits 4 and 6 being enclosed by the handle 7 of the toolholder. The shaft 3 is mounted on two radial ball bearings 8 and 9, of conventional make, whose inner rings 10 and 11, respectively, are fastened to the shaft 3. Of the outer rings, the ring 12 of the lower bearing 9 is affixed to the casing 5, whereas the ring 13 of the upper bearing is affixed to a box or shell 14 slidably and tightly mounted within the casing 5 in an axial direction, but not rotatable with respect to the casing and thus capable of being axially displaced solidly with the ring 13 of the upper bearing 8.

To allow a certain freedom of mutual axial movement between the inner rings which are fixed to the shaft 3 and the outer rings, grooves such as a and b are formed beneath the inner rings; possibly, other grooves such as groove c are provided thereabove. The shaft 3 has two rings 15 and 16 for mounting the rotor 1, enclosed in the chamber 17 between the fixed part 18, the seating of the bearing 9, and the lower portion 19 of the box 14 which is the seating of the bearing 8 and which, as aforesaid, can be axially displaced in a sealtight manner within the casing 5.

Having now described in detail the device indicated above, its operation can be summarized as follows:

Compressed air coming to the nozzle 4, in addition to driving the rotor 1 to rotation, instantaneously fills the chamber 17 by generating a pressure on the wall thereof.

By so doing, the lower surface 14' of the box or shell 14 is urged outwardly and said shell, being allowed to be displaced axially, moves and acts like a pneumatic piston.

The particular properties of the ball bearings having deep races include being able to support combined axial and radial loads, and that the slack of the ball bearings, i.e., the axial slack and the radial slack, are mutually dependent. The result is that, if the axial slack is taken up by a virtual axial load, also the radial slack will be annulled. As a matter of fact, at the outset, due to the preload pressure on 14', the outer ring 13 will be displaced with the box 14, taking up the slack in the upper bearing 8, whereas, at a subsequent time, the shaft 3 will be displaced by the inner ring 10 which tends to be drawn by the preload, thus eliminating, with the displacement of the inner ring 11, also the slack of the lower bearing 9.

Moreover, there will be a close relationship between the relative speeds of the moving bodies of said bearings and thus a desirable rolling without sliding.

Finally, compressed air, by moving the box 14 axially, wholly takes up the slack in the ball bearings, thus giving rise to an even preload on all the component parts thereof.

It should also be borne in mind that by causing the pressure of compressed air for the rotor to be varied, its speed is also varied and the axial preload is varied in the same direction, so that said preload is automatically adjusted by reaching an optimum positioning conducive to the rotation of the shaft 3 in the bearings 8–9 without any clearance.

The results are thus: elimination of vibrations and noises which at high speeds generate an unpleasant whine, and elimination of random movements of rotating bodies especially at the start wherein a maximum sliding thereof on the races is experienced along with a maximum wear.

For the dentist all this means more accurate work, no disturbing noises, noticeably reduced bearing replacements.

I claim:
1. A device for automatically taking up slack in a tool rotated at extremely high speeds comprising ball bearings, a shaft mounted on said ball bearings, said bearings including relatively displaceable parts resulting in slack, means to take up the slack by displacing the parts of the bearings with a pneumatic pressure, said parts including inner and outer rings, a compressed-air-actuated rotor keyed on said shaft and enclosed between said radial bearings, said bearings being axially movable, a rotor casing encircling rotor and shaft, the outer ring of one bearing being affixed to the rotor casing, and a box containing the other bearing, the outer ring of said other bearing being affixed to said box and said box being rotationally fixed but axially displaceable with respect to the shaft due to the action of said pneumatic pressure.

2. A bearing system for supporting a fluid-operated turbine in a dental handpiece, said bearing system comprising a turbine rotor, a shaft supporting said rotor for rotation therewith, two bearings rotatably supporting said shaft, each of said bearings including inner and outer bearing rings, a rotor casing having a cavity within which said bearings are supported, the inner bearing rings of said bearings being fastened to the shaft on opposite sides of the rotor, the outer bearing ring of one of said bearings being fastened to the rotor casing and coaxially receiving said shaft for relative sliding movement, an element slidable in said casing in an axial direction relative to said shaft, the outer bearing ring of the other of said bearings being fastened to said element and means for feeding fluid into the cavity under pressure to actuate said rotor and displace said element.

3. A bearing system according to claim 2 comprising a tool-holding mandrel on said shaft at an end thereof opposite the end supported by said element.

4. A bearing system according to claim 2, wherein said bearings are roller bearings of the type capable of resisting both radial and axial stresses.

References Cited

UNITED STATES PATENTS

| 2,442,202 | 5/1948 | Hughes-Caley. | |
| 2,954,207 | 9/1960 | Griffith | 253—2 X |
| 3,108,781 | 10/1963 | Saffir. | |
| 3,231,237 | 1/1966 | Wermstrom | 253—3 |

FOREIGN PATENTS 1,001,334   8/1965   Great Britain.

EVERETTE A. POWELL, JR., *Primary Examiner.*